(12) United States Patent
Yoshida

(10) Patent No.: US 6,788,320 B2
(45) Date of Patent: Sep. 7, 2004

(54) IMAGE FORMATION APPARATUS AND REGISTRATION METHOD

(75) Inventor: Yoshiki Yoshida, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/259,384

(22) Filed: Sep. 30, 2002

(65) Prior Publication Data

US 2003/0063178 A1 Apr. 3, 2003

(30) Foreign Application Priority Data

Sep. 28, 2001 (JP) .......................................... 2001-302596

(51) Int. Cl.$^7$ .......................... G03G 15/01; G02B 26/10
(52) U.S. Cl. ...................................... 347/116; 347/234
(58) Field of Search ................................. 399/116, 232, 399/233, 234, 235

(56) References Cited

U.S. PATENT DOCUMENTS

| | | | |
|---|---|---|---|
| 4,933,874 A | 6/1990 | Asada et al. | |
| 4,967,284 A | 10/1990 | Yoshida et al. | |
| 5,027,117 A | 6/1991 | Yoshida et al. | |
| 5,068,676 A | 11/1991 | Yoshida et al. | |
| 5,309,182 A | 5/1994 | Mama et al. | |
| 5,376,994 A | 12/1994 | Mama et al. | |
| 5,450,120 A | 9/1995 | Nishio | |
| 6,163,334 A | 12/2000 | Irie et al. | |
| 2001/0017645 A1 * | 8/2001 | Toda | 347/116 |

FOREIGN PATENT DOCUMENTS

| | | |
|---|---|---|
| EP | 0 520 809 | 12/1992 |
| EP | 0 985 980 | 3/2000 |
| JP | 10-30269 | 11/1998 |
| JP | 11-55472 A * | 2/1999 |
| JP | 2001-121739 | 5/2001 |

\* cited by examiner

Primary Examiner—Joan Pendegrass
(74) Attorney, Agent, or Firm—Oblon, Spivak, McClelland, Maier & Neustadt, P.C.

(57) ABSTRACT

One color is determined as a reference, and adjustment is carried out such that other color is matched with a detection signal generated from a synchronous detector of this color. Each control circuit of other color generates a mark pulse signal by determining an optional position based on a DP generated from each synchronous detector. A reference color control circuit receives a mark signal, and measures time relative to the reference. A CPU checks whether a result of this measurement coincides with a target value. The CPU changes the setting according to the difference, and repeats the measurement until when there is no difference, thereby obtains an adjustment value.

17 Claims, 7 Drawing Sheets

IMAGE FORMATION APPARATUS AND REGISTRATION METHOD

BACKGROUND OF THE INVENTION

1) Field of the Invention

The present invention relates to an image formation apparatus and a registration adjusting method.

2) Description of the Related Art

In an electronic photographing type image formation apparatus such as a laser printer or a digital copying machine, there has been employed a system called a tandem system. In this system, lighting of an LD (laser diode) is controlled corresponding to image data of each color component. An image holder (a photoconductor) provided for each color is main and sub scanned with each optical beam emitted from the LD. (A line scanning according to an optical beam is a main scanning, and a scanning according to a relative movement of an image holder to a direction crossing the main scanning line is a sub scanning.) An image is written based on this operation. In this case, a scanning optical system (refer to FIG. 1A, FIG. 1B and FIG. 4) is used to allocate four optical beams to left and right with a polygon mirror (a light deflector), and write an image into an image holder at a constant timing for each main scanning line scanned periodically. For this purpose, a synchronous detecting sensor that detects an optical beam at the outside of a writing area at an image write starting side is generally provided. The synchronous detecting sensor detects a passing of an optical beam scanned in the main scanning (line) direction, and starts writing an image in the main scanning direction at a predetermined timing using a generated synchronizing signal as a reference.

Figure 1A:
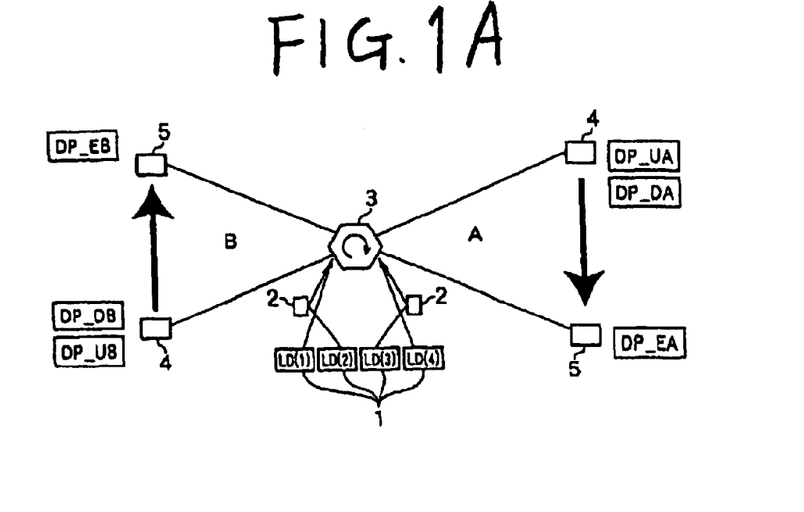
FIGS. 1A and 1B are diagrams that show an image writing optical system that allocates laser beams of four colors with one polygon mirror.
Figure 1B:
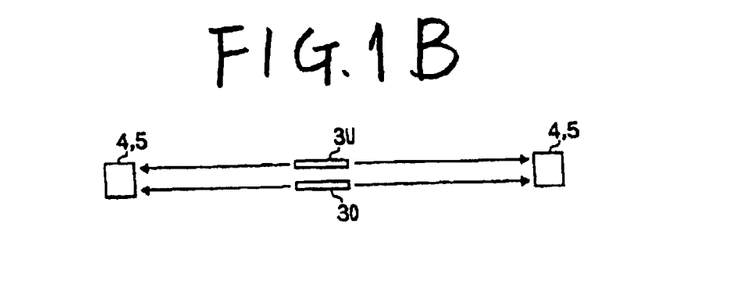

When an image of four color components including yellow (Y), magenta (M), cyan (C), and black (K) is written in this system, a temperature distribution around a lens of an fθ lens used for an optical beam scanning optical system varies according to the operation of the apparatus. Consequently, lenses of these colors have mutually different temperatures (there are many parts that are deteriorated by dust such as lenses and mirrors inside the writing optical unit, and therefore, there is no fan to generate wind, and it is hard to keep a constant temperature). As a result, characteristics of lenses become different. Therefore, in the color simultaneous writing system as shown in FIGS. 1A and 1B, a distortion occurs in the image for each color. This is due to a distance from a synchronous detecting position of each color to an image writing starting position (hereinafter to be referred to as "registration"), or a variation in the magnification based on expansion and compression of the material of the lens.

Regarding the magnification in the above factors, a solving method has been proposed conventionally (Japanese Patent Application Laid-Open No. H10-307269). Synchronous detecting sensors disposed at two points on a scanning line detect scanning beams, and can match the beams using obtained synchronous detecting signals.

Regarding the registration, a multi-color image formation apparatus (Japanese Patent Application Laid-Open No. 2001-121739) has been proposed conventionally that uses the following method. A synchronous detecting sensor that detects a scanning optical beam of each color is provided, and this sensor measures a time interval from the occurrence of a sensor detecting signal of a color determined in advance as a reference to the occurrence of a sensor detecting signal of other color. Based on this, a relative position of a synchronous detecting sensor is obtained for each color. When a variation occurs in the position obtained as a time interval, registration is adjusted according to the variation.

According to this conventional example, however, a time interval from the occurrence of a sensor detecting signal of a color determined in advance as a reference to the occurrence of a sensor detecting signal of other color is measured, and registration is adjusted based on this variation. For this purpose, it is necessary to set the sensor of each color subject to a condition that it is always possible to measure a time interval. Actually, according to the sensors shown in the conventional example, the sensor of a color determined in advance as a reference is disposed at the upstream side in the scanning direction with a distortion relative to the sensors of other colors. In other words, the layout of the sensors is limited, and the degree of freedom of design is made small.

Further, according to the above conventional example, when a measured time interval is different from the last set value, the time interval is updated based on a value measured this time. An adjustment value is set for registration adjustment based on the updated value. Even when there is an error in the measurement, this is reflected straight to the setting. Therefore, there is a risk that errors are accumulated, and it is difficult to maintain adjustment precision.

SUMMARY OF THE INVENTION

It is an object of the present invention to provide an image formation apparatus and registration adjusting method of making it possible to increase the degree of freedom of design and improve the registration adjustment precision, by detecting a scanning optical beam of each color used for registration adjustment, without limiting the layout of a synchronous detecting unit that generates a writing reference synchronization signal.

According to one aspect of the present invention, there is provided an image formation apparatus that has a writing control unit that line scans an image holder in a predetermined period with optical beams emitted from a light source of which lighting is controlled corresponding to each image data of a plurality of colors, and forms one image by superimposing written images of respective colors. The image formation apparatus comprises a synchronous detecting unit that detects each scanning optical beam and generates a writing reference synchronization signal, and a mark pulse generating unit that generates a mark pulse at a predetermined timing from the writing reference synchronization signal. The writing control unit has a time measuring unit that measures a time from a writing reference signal generated in a color determined as a reference from among a plurality of colors to a mark pulse generated in another color, and a registration adjusting unit that adjusts a registration of each of the other colors based on a change in a measured time when this change has occurred.

According to another aspect of the present invention, there is provided a registration adjusting method in an image formation apparatus that carries out writing control in order to line scan an image holder in a predetermined period common to each with optical beams emitted from a light source of which lighting is controlled corresponding to each image data of a plurality of colors, and form one image by superimposing written images of the colors. The registration adjusting method comprises the steps of generating a writing reference synchronizing signal by detecting each scanning optical beam in an operating state, generating each mark pulse at a predetermined timing from each generated writing reference synchronizing signal, measuring a time from a writing reference signal generated in a color determined as a reference from among a plurality of colors to a mark pulse generated in other color, and adjusting a registration corresponding to a change in a measured time when this change has occurred.

These and other objects, features and advantages of the present invention are specifically set forth in or will become apparent from the following detailed descriptions of the invention when read in conjunction with the accompanying drawings.

DETAILED DESCRIPTION

The present invention relates to an image formation apparatus (such as a printer, a copying machine, and a facsimile apparatus that employ a tandem image formation system) that line scans an image holder in a predetermined period with a plurality of optical beams emitted corresponding to each image data of a plurality of colors, and forms one image by superimposing written images of respective colors. Particularly, the invention relates to a registration adjusting technique that avoids a distortion that is generated in a formed image due to variations in the writing synchronizing signal of an optical beam of each color due to changes in temperature following time lapse or the like.

An embodiment of the image formation apparatus relating to the present invention will be explained with reference to the attached drawings.

The present embodiment is an application to a color image formation apparatus of an electronic photographing system, and relates to the writing of laser beams used in an image formation process for generating an electrostatic latent image on a photoconductor. An outline of a laser beam writing apparatus will be first explained.

A color image formation according to the writing of laser beams is carried out based on the following method. The lighting of an LD (laser diode) is controlled corresponding to image data of each color component. An image holder (a photoconductor) provided for each color is main and sub scanned with each optical beam emitted from the LD. (A line scanning according to an optical beam is a main scanning, and a scanning according to a relative movement of an image holder to a direction crossing the main scanning line is a sub scanning.) Written images of respective color components are superimposed.

Figure 2:
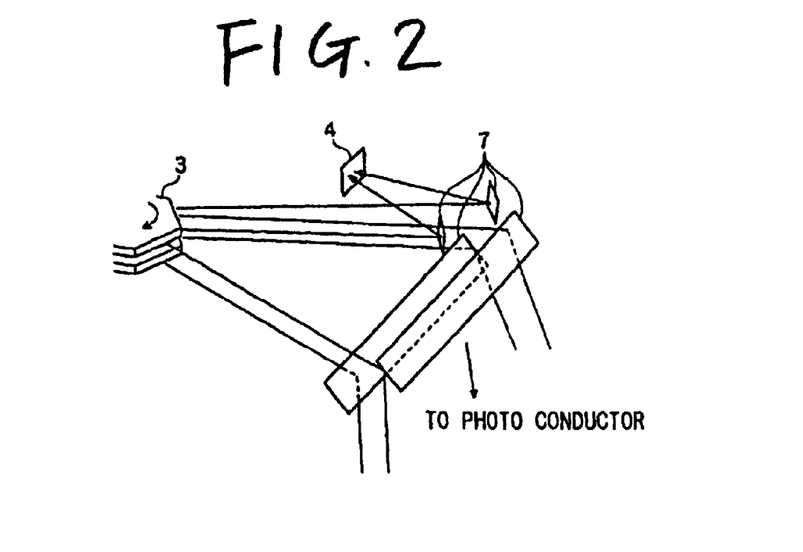
FIG. 2 is a perspective view that shows a part of the image writing optical system shown in FIGS. 1A and 1B.

FIGS. 1A and 1B show an image writing optical system. Laser beams of four colors are allocated with one polygon mirror, and an image of each color is written into each of four photoconductors not shown. FIG. 2 shows a perspective view of a part of the image writing optical system.

Referring to FIGS. 1A and 1B, according to the optical system of this embodiment, a polygon mirror 3 is used in common to allocate four laser beams from an LD unit 1 that has LD (1) to (4). The polygon mirror 3 having mirror surfaces 3U and 3D on two upper and lower stages, and a mirror 2 that directs beams to these surface are used, as shown in FIG. 1B. Further, the laser beams are allocated to sides A and B, with the polygon mirror 3 as a center, as shown in FIG. 1A. With this arrangement, respective photoconductors are scanned with optical beams of four colors including yellow (Y), magenta (M), cyan (C), and black (K). Each optical beam of each color is deflected by the polygon mirror 3, passes an fθ lens not shown, is directed to each photoconductor with a return mirror 7, passes through a BTL (barrel toroidal lens) not shown, and is irradiated, as shown in FIG. 2. Although the other single side is not shown in FIG. 2, a similar optical system is also disposed in symmetry with this optical system.

According to the image writing optical system of the present embodiment, the beam scanning directions become opposite between the side A and the side B as shown in FIGS. 1A and 1B. Therefore, the upper side in the drawing becomes a front end of the writing at the side A, and the lower side in the drawing becomes a front end of the writing at the side B.

In order to write an image in a state that no color distortion occurs between images of respective colors, a predetermined registration is set for each color from a reference position provided on the scanning line. A reference position of the registration is a position at which a synchronous detector detects a beam. At each of the side A and the side B, in front of the writing front end in the main scanning direction, a front end synchronous detector 4 is provided that detects a beam directed from the return mirror 7. At a position further ahead of the image writing back end, a back end synchronous detector 5 is provided. When a beam is incident, each synchronous detector generates a synchronous detecting signal. In other words, the front end synchronous detector 4 at the side A generates DP_UA/DP_DA, and the front end synchronous detector 4 at the side B generates DP_UB/DP_DB. The back end synchronous detector 5 at the side A generates DP_EA, and the back end synchronous detector 5 at the side B generates DP_EB.

Figure 3:
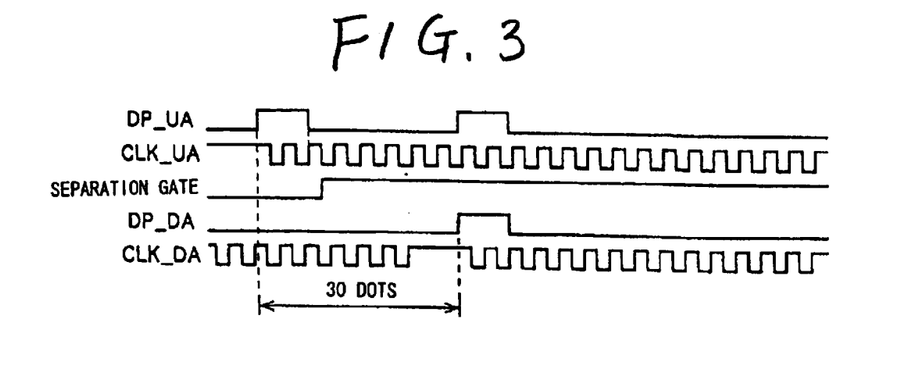
FIG. 3 is a timing chart that shows the processing of separating DP_UA and DP_DA received by the same synchronous detector.

In this example, the synchronous detectors 4 and 5 for upper and lower polygon mirrors are set common at the side A and the side B respectively, thereby to decrease the number of parts and decrease variations between the parts. In order to receive two beams with the common synchronous detector, it is necessary to separate a signal into two synchronous detecting signals (for example DP_UA and DP_DA) at the circuit side. It is possible to carry out this processing according to the conventional technique. FIG. 3 shows one example of this. FIG. 3 shows that the same synchronous detector 4 has received DP_UA and DP_DA. As shown in this drawing, as the signals of DP_UA and DP_DA are input as the same synchronous detecting signal, the synchronous detector 4 receives DP_UA, and then generates a clock CLK_UA synchronous with this signal. Thereafter, the synchronous detector 4 generates a separation GATE signal, and separates a $DP_{13}$ DA signal. Further, the synchronous detector 4 generates a clock CLK_DA in synchronism with this DP_DA signal.

While the common synchronous detectors 4 and 5 are used at the side A and the side B respectively in this example, it is of course possible to prepare a synchronous detector for each beam without using common detectors. The back end synchronous detector 5 is used to implement a conventional method of correcting a variation in the magnification of image formation based on synchronous detection at two points together with a synchronous detecting signal that is generated by the front end synchronous detector 4.

A position of forming each color image on the photoconductor is assigned by setting a predetermined registration, based on the synchronous detecting signal of each color detected by the front end synchronous detector 4 installed as described above.

A general registration setting method that is used to write an image based on a synchronous detecting signal will be explained. A resist adjusting method of the present invention is based on this method.

At a predetermined distance from the front end synchronous detector 4 that is fixed on a scanning line as a reference, a registration is set as a writing starting position. In actual practice, on the condition that the beam scanning speed on the scanning surface is constant, a writing signal LGATE is started up after a predetermined time since the front end synchronous detector 4 has output a synchronous detecting signal. This writing signal LGATE is a signal that shows an image writing range in the main scanning direction.

Figure 4:
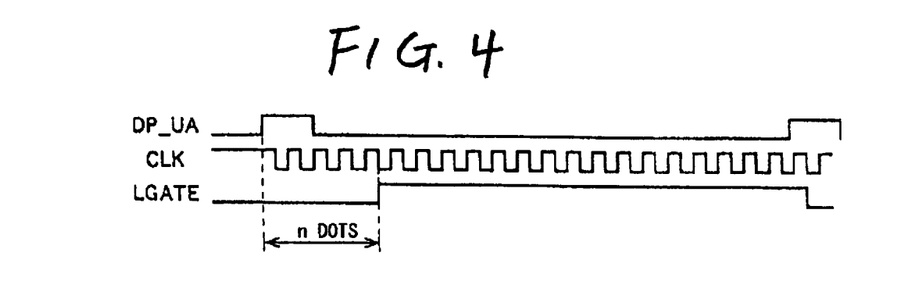
FIG. 4 is a timing chart of a signal that shows the operation at the time of starting up a writing signal LGATE.

FIG. 4 shows a timing chart of a signal that explains the operation of starting up the writing signal LGATE. FIG. 4 shows an example of the operation on the upper polygon mirror surface at the side A in FIGS. 1A and 1B. As shown in FIG. 4, LGATE is started up after a predetermined period since the output of the synchronous detecting signal DP_UA. For the predetermined time, a clock (CLK) that synchronizes the phase with the synchronous detecting signal DP_UA is used, and the number of clocks is counted. A circuit is set as follows. When a value of a counter that starts the counting of phase-synchronized CLK has reached a predetermined value (n dots in the drawing), LGATE is started up, using the synchronous detecting signal DP_UA as a clear signal. The circuit can write in a constant area (refer to FIG. 7 and FIG. 8). Therefore, it is possible to shift the writing image to the left and right (in the main scanning direction), by changing the value of the count value n dots.

Based on the above method, an adjustment to match the writing position of each color image is carried out. (In other words, this is a known adjusting method that a mark pattern to detect a color distortion is formed on a conveyer belt that conveys a sheet of recording paper, and this mark pattern is detected with a sensor. Based on a result of the detection, each image formation position is corrected.) With this arrangement, a predetermined number of clocks are set for each beam of the four colors, with the front end synchronous detector 4 as a reference position, thereby to determine LGATE. Thus, it becomes possible to write an image without a color distortion.

However, at the time of carrying out an independent setting for each color using the above adjusting method, it is difficult to maintain the precision of adjustment due to a subsequent change in the image formation apparatus with lapse of time due to a variation in temperature or the like. To overcome this difficulty, a synchronous detecting signal that becomes a reference is determined, and it is checked whether there is a change in the relationship of a synchronous detecting signal of other colors to the synchronous detecting signal that becomes the reference (a reference DP). The setting of other colors is adjusted according to this change (hereinafter this method will be referred to as a "reference DP matching method"). The change is improved based on this method.

According to the "reference DP matching method", when there is a variation in the timing that a synchronous detecting signal of another color is generated relative to the timing of the reference DP, an adjustment corresponding to this change is carried out based on a registration set value of each color. With this operation, the relationship is kept constant, and a color distortion is restricted.

Figure 5:
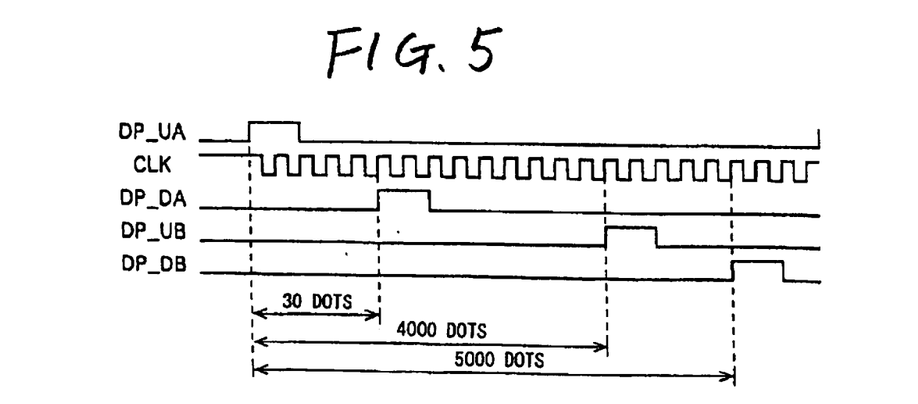
FIG. 5 is a timing chart that shows a relationship of signals of other colors with a reference DP.

FIG. 5 shows a timing chart that explains the operation of checking a variation in the timing that a signal of another color is generated relative to the timing of the reference signal, in order to adjust a registration set value of each color. In FIG. 5, the reference DP is set as DP_UA, and a time interval between this DP_UA and synchronous detecting signals of other colors DP_DA, DP_UB, and DP_DB respectively is measured. Assume that synchronous detecting signals are at ideal positions when an interval between DP_UA and DP_DA is 30 dots, an interval between DP_UA and DP_UB is 4000 dots, and an interval between DP_UA and DP_DB is 5000 dots, respectively. When an interval between DP_UA and DP_DA has become 32 dots due to a variation in temperature or the like, a registration set value to generate LGATE (this is LGATE that is counted in the clock of the DP_DA reference) that determines an image area in FIG. 4 is adjusted by subtracting 2 dots from the ideal position (the position before the variation). With this adjustment, it is possible to return LGATE to the original position by writing a count value starting from −2. For other colors (DP_UB, and DP_DB), it is also possible to return LGATE to the original positions by adjusting registration set values according to measured variation values, when these colors have changed from the ideal positional relationship.

As explained above, the counter that measures a time interval uses the reference DP as a clear or load signal, counts by using a clock phase synchronized with this synchronous detecting signal, and stops counting by using synchronous detecting signals of other colors. As the reference DP and the synchronous detecting signals of other colors are in asynchronous relationship (as a clock phase), when the counter carries out counting by using other clock that is not synchronous with the reference DP, count starting and count stopping both become asynchronous. At this time, there is a risk that an error that is larger than a dot occurs due to errors occurring in both. However, it is possible to restrict this error to within a dot.

An embodiment of a registration adjusting method according to the present invention and an image formation apparatus that has a unit that carries out an image writing according to this method will be explained.

According to the present invention, a target value is set as a registration-adjusted value of each color obtained to avoid a color distortion between a plurality of colors. When a registration has been distorted from the target value due to a time lapse attributable to a subsequent variation in temperature or the like and also when it has become impossible to maintain the precision of the adjustment, the method and the unit make it possible to detect a registration distortion and carry out adjustment in high precision even when the apparatus is in the middle of the writing.

The registration adjusting method of the present invention is basically in line with the above "reference DP matching method", but can overcome problems that occur from this method. In other words, according to the "reference DP matching method", a time interval from the occurrence of the reference synchronous detecting signal till the occurrence of a synchronous detecting signal of another color is measured, and the registration is adjusted based on this variation. For this purpose, the synchronous detector 4 must be provided on the condition that it is always possible to measure such time interval. This limits the layout of the synchronous detector 4, and it is not possible to take a large degree of freedom of design. Therefore, according to the present invention, a mark pulse signal is generated by determining an optional position (a "timing" on the circuit, in actual practice) based on a synchronous detecting signal of other color. A matching with the reference DP is carried out according to the generated mark pulse, thereby to eliminate this limit. Based on the method of generating a mark pulse signal, it is possible to avoid the conventional problems that a mark pattern is formed on the conveyer belt that actually conveys the recording paper, a distance between marks is measured, and a registration is adjusted based on this length, thereby requiring a whole apparatus. It is possible to avoid such a situation that it is not possible to guarantee the registration due to the temperature of a unit. It is possible to detect a registration deviation even when the apparatus is in the middle of the writing of an image, and it is possible to adjust the registration based on this.

Figure 6:
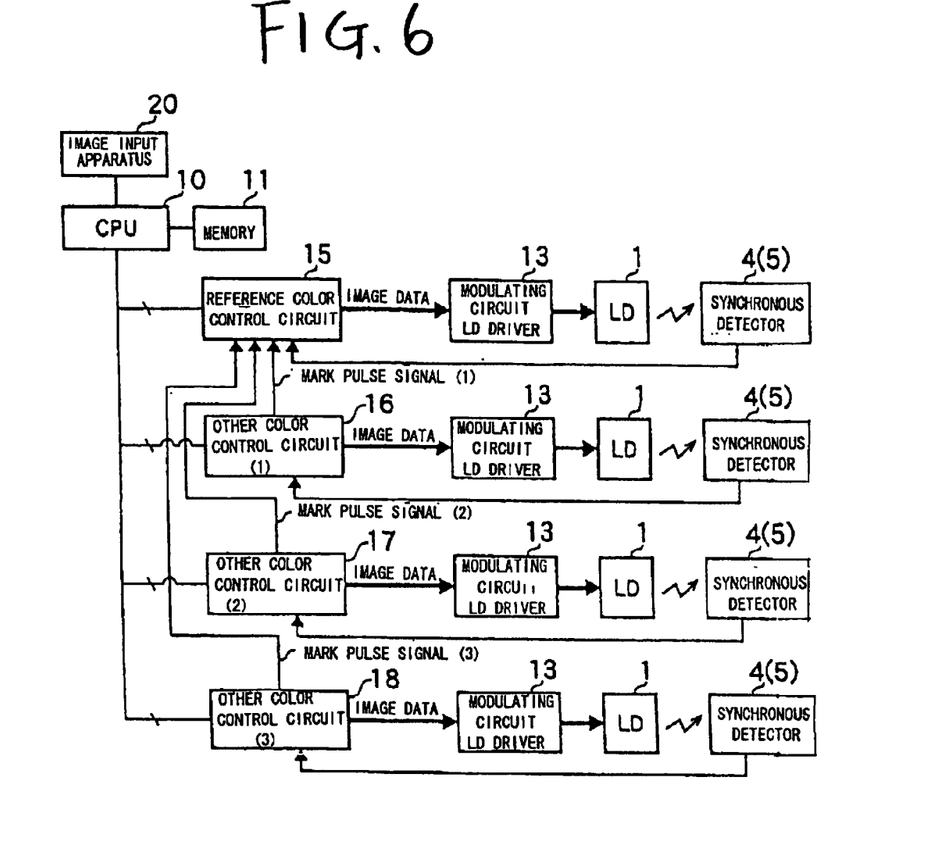
FIG. 6 shows an outline structure of a circuit relating to an image write processing of an image formation apparatus according to the present invention.

FIG. 6 shows an outline structure of a circuit relating to an image writing processing of the image formation apparatus according to the present invention.

A circuit of the present embodiment has image writing sections by the number of color components ("4" in the present example). Referring to FIG. 6, the image writing section of each color comprises an LD1 (refer to FIGS. 1A and 1B) that generates a writing beam to an image holder such as a photoconductor, an LD driver 13 that controls the light emission of the LD1 with a modulation signal generated based on image data, a synchronous detector 4 (refer to FIG. 1A, FIG. 1B and FIG. 2) fixed on the scanning line, and control circuits 15 to 18 each of which generates a writing signal LGATE for each scanning line based an a synchronous detecting signal from the synchronous detector 4, and transmits image data to the LD driver 13 according to the timing operation of LGATE.

A CPU 10 has a memory 11 under its control that stores data necessary for operating each section of the apparatus and a program for controlling each section of the apparatus. The CPU functions as a system controller that controls the whole apparatus including an image input apparatus (such as a scanner, and a printer controller that receives print data generated at the outside via an I/F) 20 that generates image data that becomes a source of a writing image to be written by the image writing section, the writing control circuits 15 to 18, a polygon motor driving control circuit not shown, and an image holder (such as a photo-sensitive drum) driving motor control circuit not shown.

At the time of carrying out a normal image writing control, the CPU 10 sets operation conditions to the writing control circuits 15 to 18, and transmits a signal necessary to carry out the writing control and image data delivered from the image input apparatus 20, according to an instruction from the console section not shown or an instruction included in the input data.

Further, the CPU 10 carries out a registration adjustment processing to be described later in detail, by carrying out a matching with the reference DP according to the mark pulse, stores the operation conditions changed based on the adjustment as set data, and reflects the data to the control operation at the image writing time.

An embodiment of the writing control circuit shown in FIG. 6 will be explained next.

Each of the writing control circuits 15 to 18 includes a circuit that generates LGATE according to a set value as a factor necessary to carry out a normal image writing control, and also includes a circuit that measures time data from the reference DP to the mark pulse signal of other color as a factor necessary to obtain a registration adjustment level.

For the circuit that generates LGATE, a circuit for each color is provided that realizes the writing signal LGATE to be started up alter a predetermined time since the front end synchronous detector 4 has output a synchronous detecting signal, in a similar manner to the above (refer to FIG. 4). On the other hand, for the circuit that measures a timing of a mark pulse signal to obtain a registration adjustment level, a measuring circuit is structured by determining in advance other colors to be matched with the reference color, in order to use the measurement data to match with the reference DP. The following embodiment shows K as the reference, and M, C, and Y as other colors. It is also possible to use other color than K as the reference.

Figure 7:
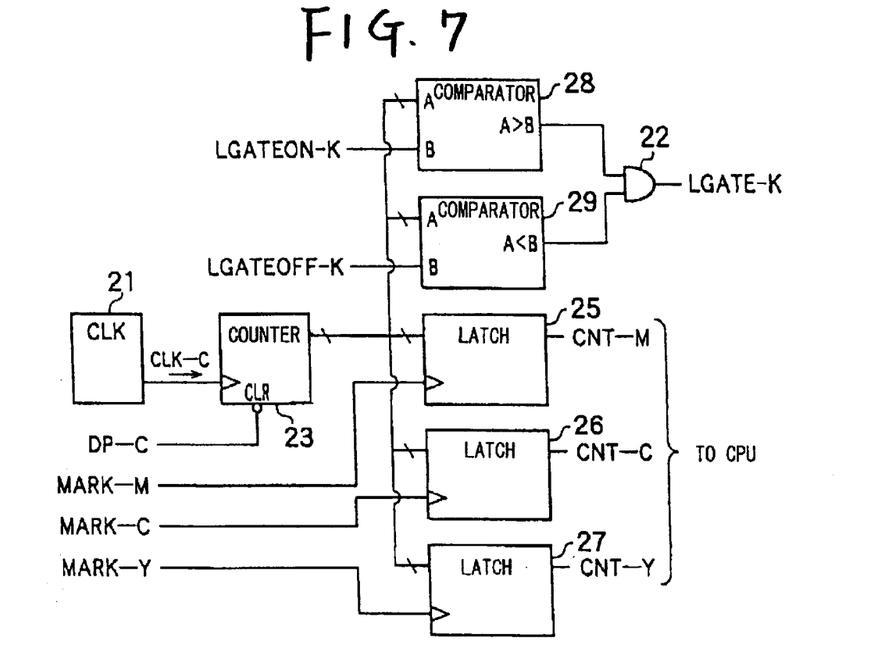
FIG. 7 is a diagram that shows a circuit structure of a writing control circuit of a reference color shown in FIG. 6 in further detail.
Figure 8:
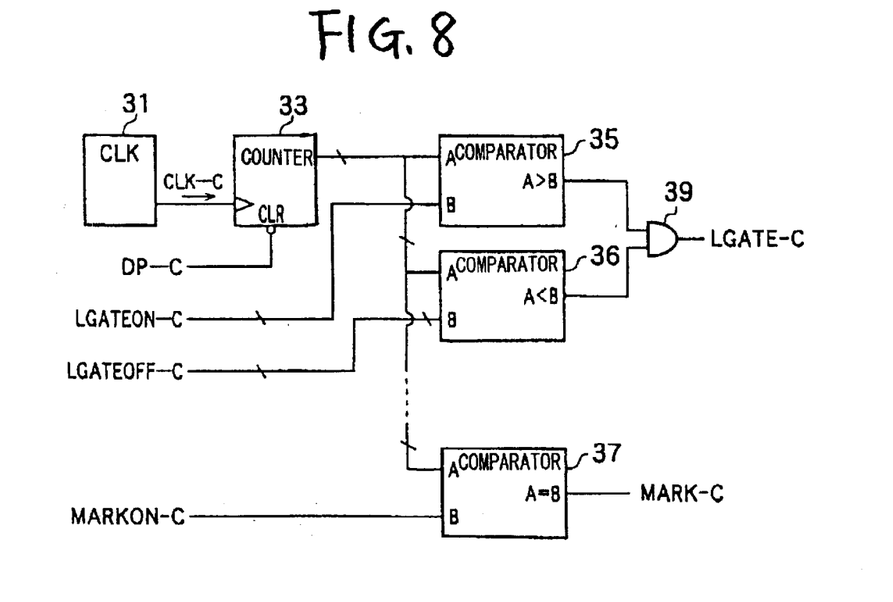
FIG. 8 is a diagram that shows a circuit structure of a writing control circuit of other colors shown in FIG. 6 in further detail.
Figure 9:
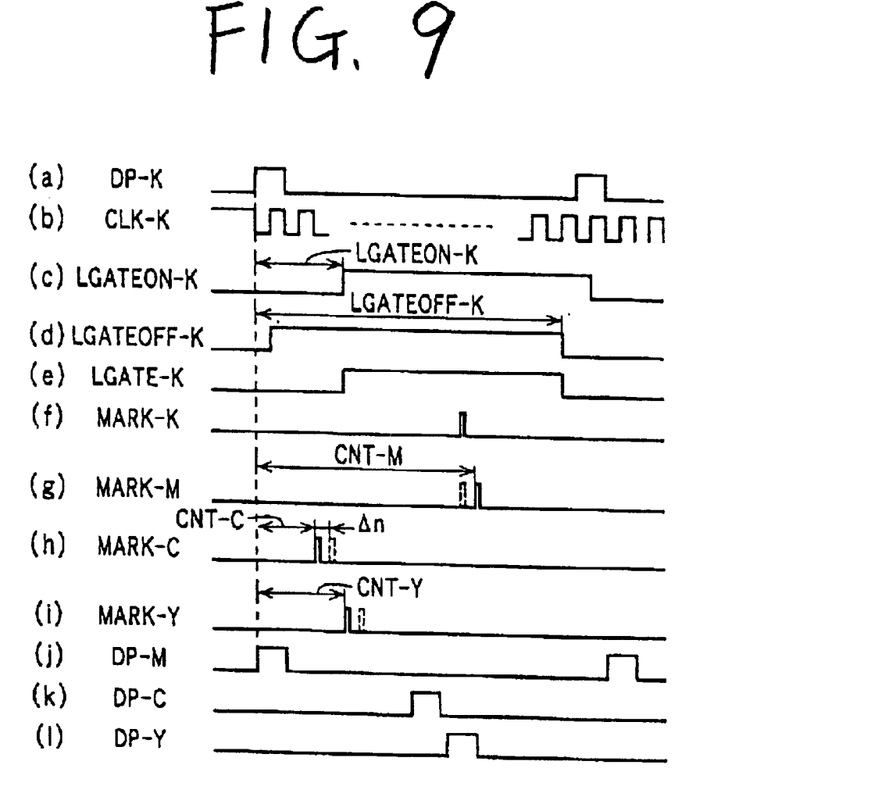
FIG. 9 is a timing chart that shows an operation signal of a circuit shown in FIG. 7 and FIG. 8.

FIG. 7 shows a circuit structure of the writing control circuit 15 of a reference color in further detail, and FIG. 8 shows a circuit structure of the writing control circuits 16 to 18 of other colors in further detail. FIG. 8 shows an example that other color is C. A similar circuit is structured for M and Y. FIG. 9 shows a timing chart of a signal that appears on the circuit in order to explain the operation of the circuits shown in FIG. 7 and FIG. 8.

Referring to FIGS. 7 to 9, each one of the reference color control circuit 15 and the other color control circuits 16 to 18 has a circuit that generates a writing signal LGATE. The reference color control circuit 15 generates an own writing signal LGATE using a comparator A>B 28, a comparator A<B 29, and an AND circuit 22. Each of the other color control circuits 16 to 18 similarly generates an own writing signal LGATE using a comparator A>B 35, a comparator A<B 36, and an AND circuit 39.

The operation of generating LGATE will be explained by taking the reference color control circuit 15 as an example. CLK 21, which each circuit has, is generated (FIG. 9(b)) by phase-synchronizing a pixel clock or CLK-K that is an integer times this pixel clock with DP-K (a synchronous detecting signal of K; refer to FIG. 9(a)), and is input to a counter 23. The counter is cleared with DP-K that is input to a CLR terminal of the counter 23, and a count value to be counted thereafter is input to terminals A of the comparators 28 and 29. The comparator A>B 28 compares a count value of the terminal A with an LGATEON-K value of the terminal B set from the CPU 10 in order to determine a timing (that is, a registration) of starting up LGATE, and outputs a signal that is started up when A>B (FIG. 9(c)). The comparator A<B 29 compares a count value of the terminal A with an LGATEOFF-K value of the terminal B set from the CPU 10 in order to determine a timing of falling LGATE, and outputs a signal that falls when A<B (FIG. 9(d)). An AND circuit 22 takes AND of the outputs of both comparators 28 and 29. Therefore, the output becomes a writing signal LGATE-K (FIG. 9(e)) that determines an image writing period, and is used by the LD driver 13 as an image writing signal of K.

The above operation of generating LGATE is similarly applied to the other color control circuits 16 to 18. Based on the example of C shown in FIG. 8, the AND circuit 39 outputs a writing signal LGATE-C.

A circuit that carries out a registration adjustment and the operation thereof will be explained with reference to FIG. 7, FIG. 8 and FIG. 9.

According to the present invention, a mark pulse signal is generated by determining an optional position (a "timing" on the circuit, in actual practice) based on a synchronous detecting signal that is generated for each color. A matching with the reference DP is carried out according to the generated mark pulse.

In other words, a mark pulse is generated, and it is checked whether the timing of the generated mark pulse and the timing of the reference DP are in a predetermined relationship. This checking is carried out by measuring a pulse interval between the mark pulse and the pulse of the reference DP (hereinafter to be referred to as a "mark interval measurement"). When a difference has been recognized in the result of measurement this time from the past measuring result, this is due to the fact that there has been a deviation in the timing of generating a synchronous detecting signal due to time lapse or due to a fact that there has been made a change to the condition such that a difference has occurred in the CLK frequency. The setting of the writing signal LGATE is changed to adjust the registration according to this deviation (matching with the reference DP). It is possible to prevent a color distortion in the formed image in this way.

The generation of a mark pulse signal will be explained. In the other color control circuit shown in FIG. 8, the comparator 37 structures this unit. While C is used as the other color in FIG. 8, a similar circuit is structured for M and Y as well.

DP-C is input to the terminal A of this comparator 37. DP-C is a synchronous detecting signal of C, that is a count value of CLK-C generated by phase synchronizing (k) in FIG. 9 using DP-C as a clear signal. In other words, this is time data from DP-C same as that used to generate LGATE in the above. MARKON-C data that has been set from the CPU 10 in order to determine the timing of starting up the mark pulse signal of C is input to the terminal B. With this arrangement, the comparator 37 outputs a MARK-C signal (FIG. 9(h)) when A=B and when a timing for starting up the mark pulse signal has come.

The MARK-C signal generated above is transferred to the reference color control circuit shown in FIG. 7 (shown by 15 in FIG. 6), and is used to measure a timing relative to the timing of the reference DP (DP-K). A MARK-M signal and a MARK-Y signal (FIGS. 9(g) and (i)) that are output are sent to the reference color control circuit in a similar manner, for M and Y.

For the "mark interval measurement" from the reference DP measured by the reference color control circuit, latches 25 to 27 structure a unit for this in the reference color control circuit shown in FIG. 7.

DP-K is input to the latches 25 to 27. DP-K is a synchronous detecting signal of K, that is a count value of CLK-K generated by phase synchronizing (b) in FIG. 9 using DP-K as a clear signal. In other words, this is time data from DP-K same as that used to generate LGATE in the above. This input time data is latched using a mark pulse signal as a stop signal. Based on the latch, the "mark interval measurement" is carried out, and it becomes possible to obtain this data.

When the color is C, the MARK-C signal is latched as a stop signal, and CNT-C is obtained as "mark interval measurement" data from the reference DP. This data includes a deviation (Δn in FIG. 9(h)) in the output timing of the MARK-C signal due to time lapse. Therefore, this data is sent to the CPU 10 in order to carry out a registration adjustment.

The registration adjustment processing carried out by the CPU 10 will be explained next.

The CPU 10 receives CNT-C, CNT-M, and CNT-Y (time data from the reference DP to the other color mark pulse signal) measured by the reference color control circuit 15. The CPU 10 checks whether the measured "mark interval measurement" data (CNT-C, CNT-M, and CNT-Y) coincides with a set target value of the registration condition that there is no color distortion. When the measured "mark interval measurement" data does not coincide with the set target value, the CPU 10 corrects the set data (MARK ON, LGATE ON) to coincide with the target value.

For the target value, there is used a value that has been experimentally confirmed based on the registration condition that no color distortion occurs. For example, a value obtained at the plant shipment time is used based on a known adjusting method of matching each color with a reference mark provided on the surface of an image holder on which an image is actually formed, such as a belt surface when a transfer belt is used. Alternatively, a value determined based on experience may be used. When it has been confirmed by experiment that the value obtained shows a constant variation based on an environmental temperature, a difference between the temperature and the target value may be prepared as a temperature table in advance. It is possible to set a suitable target value by referring to this table based on the temperature at the adjusting time. Further, based on the default value determined above, a user may update the last target value using a value adjusted in different using conditions, thereby to set a new target value.

MARK ON data is corrected according to a difference between the set target value and the measured "mark interval measurement". The "mark interval measurement" data (CNT-C, CNT-M, and CNT-Y) changes based on the corrected data. Therefore, measurement is carried out again, and coincidence with the target value is checked again. The data correction is continued until when these values coincide with each other.

Figure 10:
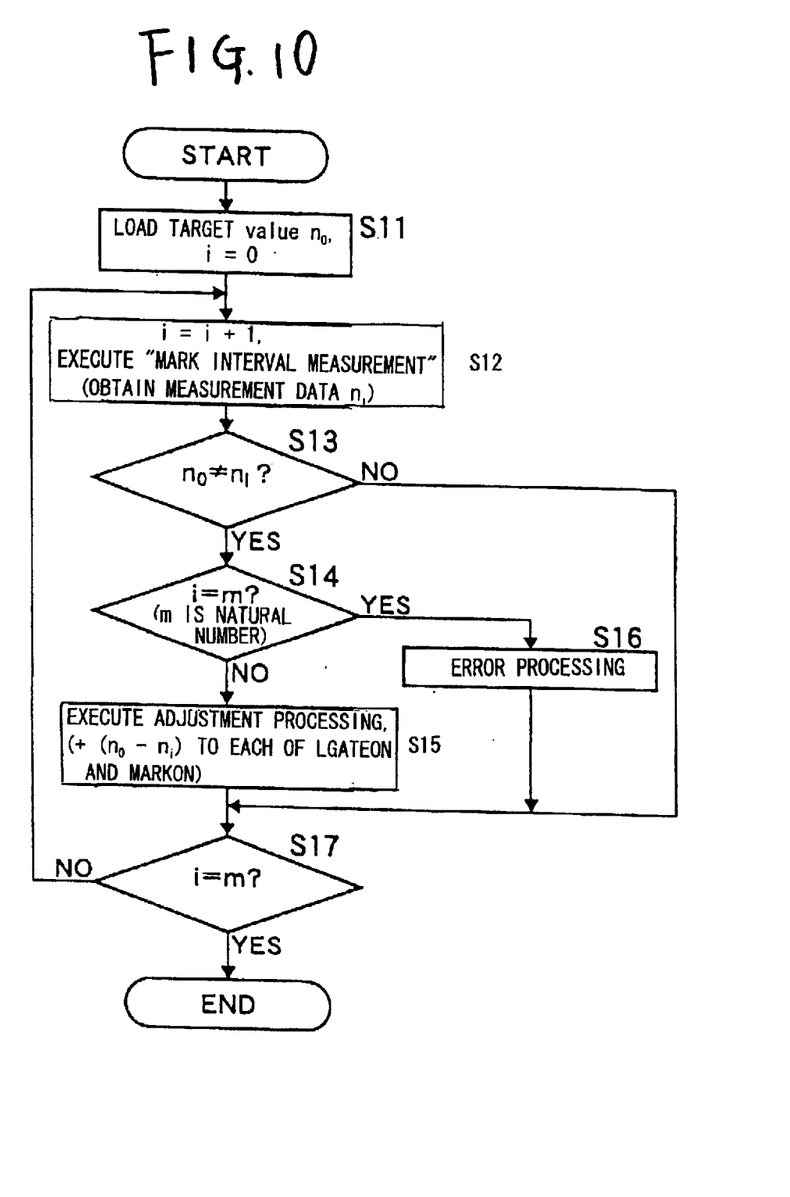
FIG. 10 is a flowchart that shows an embodiment relating to a registration adjustment processing.

FIG. 10 shows an embodiment of a flowchart relating to a registration adjustment processing.

Referring to FIG. 10, the registration condition that no color distortion occurs is obtained as described above, and a target value (n0) stored in the memory is loaded to use it in this processing (S1). The target value (n0) is the target value corresponding to the "mark interval measurement" data (CNT-C, CNT-M, and CNT-Y). The "mark interval measurement" is repeated to confirm a result of the adjustment each time when it is carried out by a maximum number m as a number (i) of repetition. Therefore, this number is initialized as i=0.

Next, the number i is advanced to i=i+1, and the "mark interval measurement" is carried out according to the currently set MARK ON data to obtain measurement data (ni) (S12).

It is decided whether the obtained measurement data (ni) does not coincide with the target value (n0) (that is, whether n0≠ni) (S13) When it is not possible to decide that the obtained measurement data (ni) does not coincide with the target value (n0) (S13—NO), it is not necessary to carry out adjustment. Therefore, the process returns to step S12 to carry out the "mark interval measurement" again, without carrying out the processing to change the data, and the "mark interval measurement" is repeated by m times (S17—YES). Then, the processing ends.

On the other hand, when the obtained measurement data (ni) does not coincide with the target value (n0) (S13—YES), it is necessary to carry out adjustment. Therefore, adjustment processing is carried out (S15). In order to make the "mark interval measurement" data (CNT-C, CNT-M, and CNT-Y) coincide with the target value, the MARK ON data to start up the mark pulse signal is corrected, thereby avoiding non-coincidence. The correction is carried out by adding a difference (n0−ni) to the data. In order to reflect the correction level to the setting of the registration of the normal image writing, it is also necessary to carry out the same correction (n0−ni) to LGATE ON. Therefore, this processing is carried out.

After carrying out the adjustment processing, the process returns to step S12 to carry out the processing to confirm whether the "mark interval measurement" data (CNT-C, CNT-M, and CNT-Y) coincides with the target value based on the data after the adjustment within the limit of m times. The measurement and checking are repeated (S12 and 13) to avoid error for better adjustment.

When it has not been possible to make the "mark interval measurement" data coincide with the target value after carrying out the confirmation by the prescribed m times (S14—YES), it is regarded that an abnormality has occurred, and an error processing is carried out to make the user recognize that it is necessary to inspect setting values starting from the initial setting including the stopping of the apparatus (S16).

An embodiment of an execution timing of registration adjustment will be explained.

In the above registration adjustment processing shown in FIG. 10, the data of the difference (n0−ni) to be used for the correction to make the "mark interval measurement" data (CNT-C, CNT-M, and CNT-Y) coincide with the target value is calculated. Then, the set values of new MARK ON data and LGATE ON data are obtained. It is possible to carry out this processing at an optional timing when the reference DP (a synchronous detecting signal) and a DP of other color are output. Therefore, it is preferable to be able to calculate at least the "mark interval measurement" and the difference value (n0−ni) even during the image writing, thereby to improve the total processing efficiency.

However, it is desirable that the adjustment following the set value of the LGATE ON data newly obtained by the registration adjustment processing is actually reflected to the registration of the image writing at a timing during a period from when the printing of a frame of one unit ended till when the printing of the next frame starts. This is because when a correction is carried out during the image writing, the image may shift and this becomes conspicuous.

Figure 11:
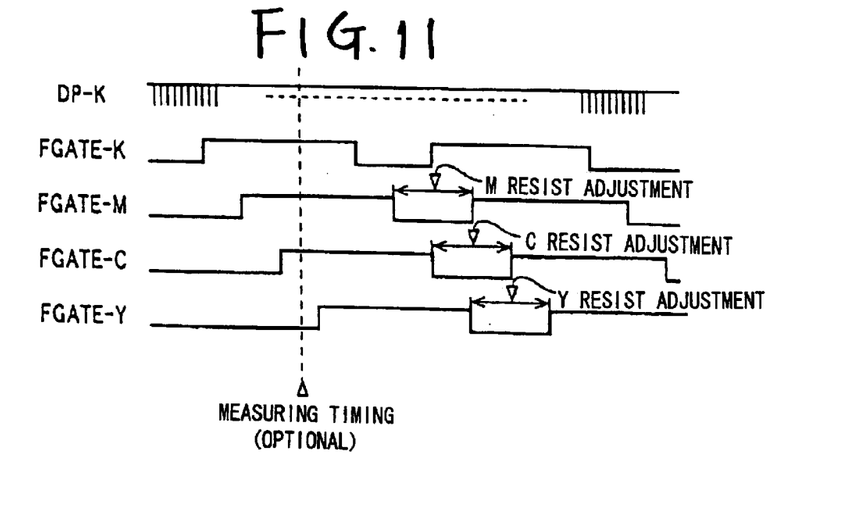
FIG. 11 is a diagram that shows a timing of a registration adjustment processing.

FIG. 11 is a diagram that explains the timing of this processing. As shown in FIG. 11, DP-K is always output as well as DPs of other colors. Therefore, it is possible to select an optional measuring timing for carrying out the "mark interval measurement" and the calculation of the difference value (n0−ni), even when image writing periods (frame period) of colors FGATE-K, M, C and Y are ON. The registration adjustment of M, C and Y, that is, the changing of the setting of the LGATE ON data after the adjustment, is carried out while FGATE-M, C and Y are OFF.

A change in the environmental temperature has been explained above as one of the variation factors which requires registration adjustment according to the "mark interval measurement".

The environmental temperature changes the refractive index of the lens that focuses a beam emitted from the LD on the scanning line of the photoconductor as a spot beam. Therefore, the magnification of the image to be formed changes due to the temperature. This has been conventionally corrected by changing the frequency of pixel click. When the method of correcting the change in the magnification due to temperature by changing the frequency is employed, different frequencies are used among colors. For example, the clock frequency fk of K and the clock frequency fc of C become fk≠fc. In this case, according to the conventional registration setting method, a variation occurs in the registration due to the difference in frequencies, and a color distortion occurs. However, according to the registration adjustment method based on the "mark interval measurement" of the present invention for measuring the timing of the mark pulse signal relative to the timing of the reference DP (DP-K), it is possible to absorb this variation.

Further, the environmental temperature expands and contracts the optical housing along a change in temperature, and this changes the position of the synchronous detector 4. When this positional change is different between colors, according to the conventional registration setting method, a color distortion occurs, as a registration is determined from the synchronous detecting signal DP of each color. However, according to the registration adjustment method based on the "mark interval measurement" of the present invention for measuring the timing of the mark pulse signal relative to the timing of the reference DP (DP-K), it is also possible to avoid this variation by adjustment.

As explained above, the registration adjustment according to the "mark interval measurement" of the present invention is effective for temperature compensation. Therefore, for instructing the execution of the registration adjustment, it is necessary to improve the performance of the apparatus by selecting a suitable timing.

The suitable timing is the timing when there is a possibility of the occurrence of a change in the environmental temperature. This timing is different depending on how the target value of registration adjustment is set or depending on the using environment. There is a high possibility that a registration distortion occurs due to a change in temperature, at the time of starting up the power source of the apparatus or at the time of starting the image formation. Therefore, adjustment is carried out at least at this timing. The CPU 10 starts the registration adjustment processing when it has received a recognition signal of this timing based on the turning ON of the power source with the ON/OFF key, the depression of the start key of the copying machine or the printer, or the reception of a print request instruction from the outside.

An example of a registration adjustment execution flow that shows a registration adjustment carried out following a necessary execution timing set after the start of the image formation will be explained.

In this example, a timing at which adjustment becomes necessary is caught through the monitoring of a change state. For example, time lapse or an image formation processing level (for example, a number of copied sheets of paper) is detected after starting the image formation. When a preset value has changed, the adjustment is started.

Figure 12:
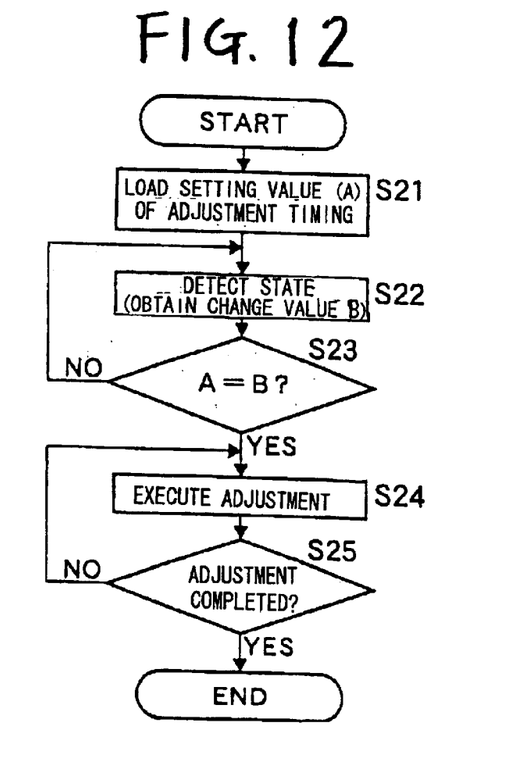
FIG. 12 is a flowchart that shows an embodiment relating to a registration adjustment.

FIG. 12 shows a registration adjustment flow relating to this embodiment.

Referring to FIG. 12, a set value A that is preset as a timing at which adjustment becomes necessary is loaded to use it in this processing (S21). This set value is a time lapse or a number of copied sheets of paper since the starting of the image formation processing.

When the time lapse or the number of copied sheets of paper has reached the set value (S23—YES), the registration adjustment is started. For this registration adjustment, the above registration adjustment processing sequence (refer to FIG. 10) is carried out (S24). After confirming the completion of the registration adjustment (S25), the flow ends.

When the time lapse or the number of copied sheets of paper has reached the set value (S23—YES), the resist adjustment is started. For this resist adjustment, the above resist adjustment processing sequence (refer to FIG. 10) is carried out (S24). After confirming the completion of the resist adjustment (S25), the flow ends.

Following this flow, the registration adjustment is executed at a timing of high possibility of the occurrence of a color distortion. Based on this, it becomes possible to prevent a color distortion in advance without increasing the processing load of normal execution.

The apparatus of writing laser beam images onto photoconductors to form a color image has been explained above. In order to structure an image formation apparatus, it is necessary to provide a unit that executes a process of forming a color image on a sheet of transfer paper after the image writing apparatus has written an image of each color component onto each photoconductor.

The image formation process for forming a color image on a sheet of transfer paper by matching images of various color components can be executed by applying a method that is used in an existing tandem system color laser printer, color copying machine or the like.

A mark pulse signal is generated by determining an optional position based on a synchronous detecting signal (DP) that is generated for each color. A matching with the reference DP is carried out according to the generated mark pulse, thereby to eliminate constraint of the layout of synchronous detecting signals. Therefore, based on a simple system, it is possible to avoid the conventional problems that a mark pattern is actually written and a distance between marks is measured, thereby requiring a whole apparatus. It is possible to carry out registration adjustment within the apparatus, and it is possible to adjust corresponding to a time lapse change such as the environmental temperature. Consequently, it is always possible to form an image without any color distortion.

As the "mark interval measurement" is carried out by using an image writing clock that is synchronous with the reference DP, it is possible to keep the measurement precision at a constant level, and can guarantee formation of high-quality image as a result.

As a common optical beam deflecting unit scans each optical beam, it becomes possible to simplify the structure and can further improve the precision of color matching.

As the invention is applied to an image formation apparatus of the system that carries out simultaneous writing to each image holder by using a common rotational polygon mirror, it is possible to realize the above effect in a high-speed apparatus. Further, it becomes possible to achieve high performance.

As the registration adjustment is carried out at the FGATE OFF timing, it is possible to avoid degradation of picture quality (for example, an image shift) when the adjustment is carried out during the image writing. Consequently, it is possible to guarantee high image quality.

As a time difference between the "mark interval measurement" value and the target value (an experimental value, an experience value, or a value used immediately before that gives a proper condition) is reflected to the LGATE signal, it is possible to realize a proper adjustment in a simple manner.

As the registration adjustment processing is repeated until when there is no time difference between the "mark interval measurement" value and the target value, it is possible to minimize the occurrence of en erroneous adjustment.

As the registration adjustment is carried out immediately after the reception of an image formation instruction, it is possible to carry out an effective adjustment to a condition that has changed during the image formation operation stop period.

It is possible to carry out an effective adjustment corresponding to time lapse change such as the environmental temperature that has a high potential of occurrence during the image formation.

The present document incorporates by reference the entire contents of Japanese priority document 2001-302596, filed in Japan on Sep. 28, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image formation apparatus comprising:
   a writing control unit that line scans an image holder in a predetermined period with optical beams emitted from a light source of which lighting is controlled corresponding to each image data of a plurality of colors, and forms one image by superimposing written images of respective colors;
   a synchronous detecting unit that detects each scanning optical beam and generates a writing reference synchronization signal; and
   a mark pulse generating unit that generates a mark pulse at a predetermined timing from the writing reference synchronization signal, wherein
   the writing control unit has
      a time measuring unit that measures a time from a writing reference signal generated in a color determined as a reference from among a plurality of colors to a mark pulse generated in other color, and
      a registration adjusting unit that adjusts a registration of each of other colors based on a change in a measured time when this change has occurred.

2. The image formation apparatus according to claim 1, wherein
   the time measuring unit is a unit that carries out measurement by referring to a writing clock of an image that is synchronized with a writing reference signal generated in a color determined as a reference.

3. The image formation apparatus according to claim 1, wherein a common optical beam deflecting unit carries out the line scanning of the image holder with each optical beam.

4. The image formation apparatus according to claim 3, wherein
the image holder is provided for each color, and the optical beam deflecting unit is a rotary polygon mirror which is a unit that scans each image holder with a beam of each color allocated by the rotary polygon mirror.

5. The image formation apparatus according to claim 1, wherein
the writing control unit is a unit that carries out a registration adjustment at a timing when a signal showing an image writing range in a sub scanning direction is not output.

6. An image formation apparatus comprising:
a writing control means for line scanning an image holder in a predetermined period with optical beams emitted from a light source of which lighting is controlled corresponding to each image data of a plurality of colors, and forms one image by superimposing written images of respective colors;
a synchronous detecting means for detecting each scanning optical beam and generates a writing reference synchronization signal; and
a mark pulse generating means for generating a mark pulse at a predetermined timing from the writing reference synchronization signal, wherein
the writing control means has
a time measuring means for measuring a time from a writing reference signal generated in a color determined as a reference from among a plurality of colors to a mark pulse generated in other color, and
a registration adjusting means for adjusting a registration of each of other colors based on a change in a measured time when this change has occurred.

7. The image formation apparatus according to claim 6, wherein
the time measuring means is a unit that carries out measurement by referring to a writing clock of an image that is synchronized with a writing reference signal generated in a color determined as a reference.

8. The image formation apparatus according to claim 6, wherein
a common optical beam deflecting means carries out the line scanning of the image holder with each optical beam.

9. The image formation apparatus according to claim 8, wherein
the image holder is provided for each color, and the optical beam deflecting means is a rotary polygon mirror which is a unit that scans each image holder with a beam of each color allocated by the rotary polygon mirror.

10. The image formation apparatus according to claim 6, wherein
the writing control means is a unit that carries out a registration adjustment at a timing when a signal showing an image writing range in a sub scanning direction is not output.

11. A registration adjusting method comprising the steps of:
carrying out a writing control for line scanning an image holder in a predetermined period common to each with optical beams emitted from a light source of which lighting is controlled corresponding to each image data of a plurality of colors, and forming one image by superimposing written images of respective colors;
generating a writing reference synchronizing signal by detecting each scanning optical beam in an operating state;
generating each mark pulse at a predetermined timing from each generated writing reference synchronizing signal, and measuring a time from a writing reference signal generated in a color determined as a reference from among a plurality of colors to a mark pulse generated in other color; and
adjusting a registration corresponding to a change in a measured time when this change has occurred.

12. The registration adjusting method according to claim 11, wherein
the time measuring is carried out by referring to a writing clock of an image that is synchronized with a writing reference signal generated in a color determined as a reference.

13. The registration adjusting method according to claim 11, wherein
the change is obtained as a time difference from a set target value, and a registration is adjusted by reflecting the obtained time different to a signal showing an image writing range in a main scanning direction signal.

14. The registration adjusting method according to claim 13, wherein
the registration adjustment and the measurement of the time difference are repeated until when there is no time difference.

15. The registration adjusting method according to claim 11, wherein
the registration adjustment that is carried out after obtaining a time change based on the time measuring is carried out at a timing when a signal showing an image writing range in a sub scanning direction is not output.

16. The registration adjusting method according to claim 15, wherein
the registration adjustment is executed immediately after the reception of an image formation instruction.

17. The registration adjusting method according to claim 15, wherein
the registration adjustment is executed at a timing determined based on an image formation processing time from an image formation instruction or an image formation processing level.

* * * * *